March 29, 1966 T. STERN ET AL 3,242,909
VAPOR GENERATORS
Filed Dec. 4, 1964 2 Sheets-Sheet 1
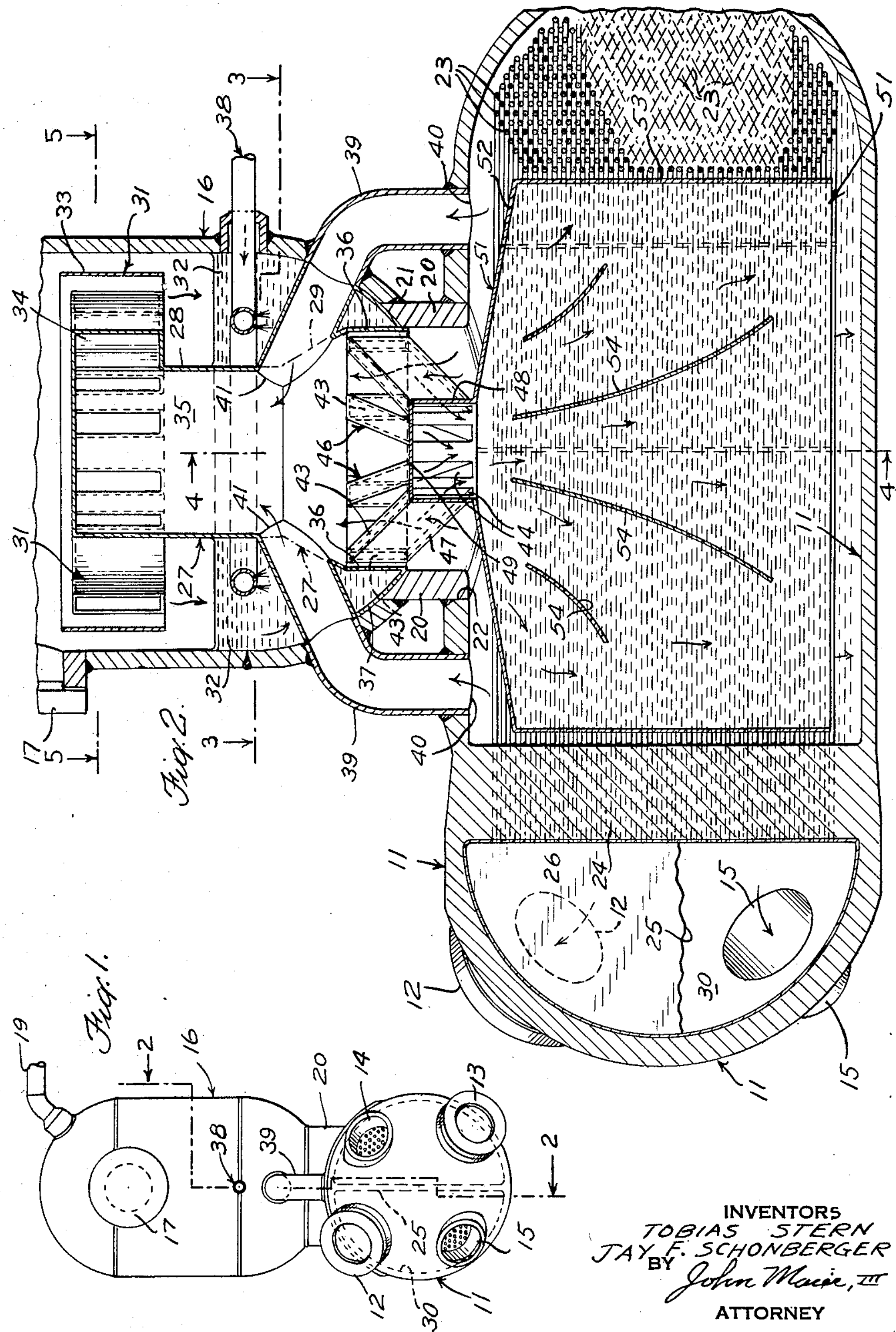
INVENTORS
TOBIAS STERN
JAY F. SCHONBERGER
BY John Maier, III
ATTORNEY VAPOR GENERATORS
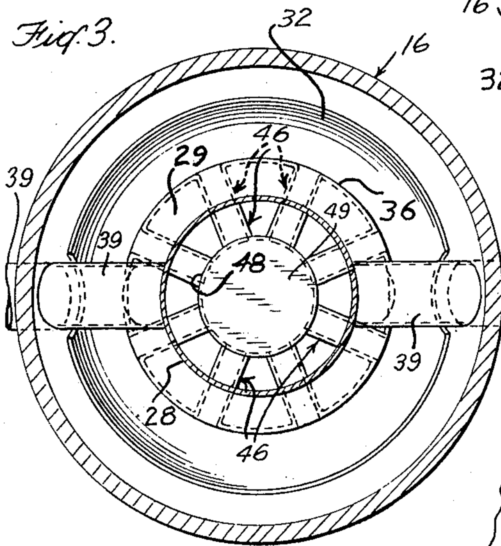
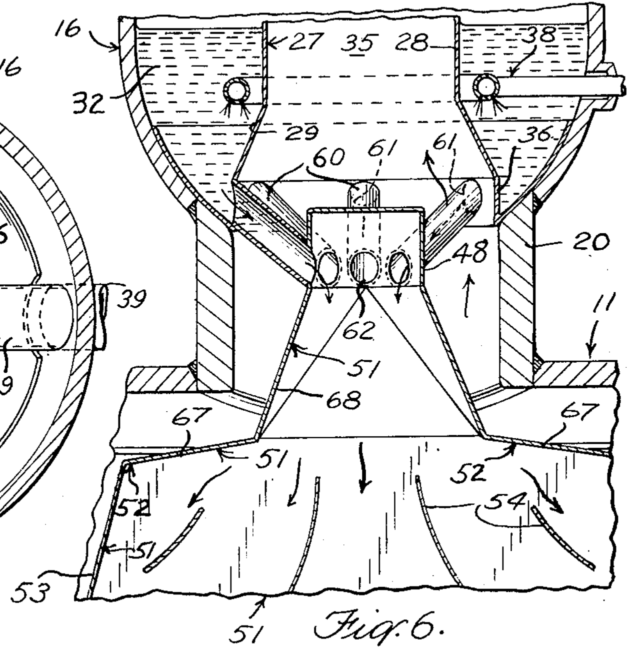
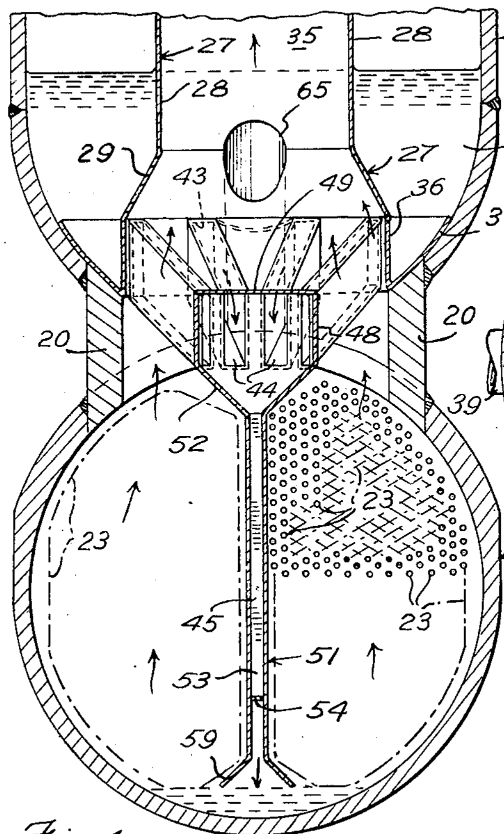
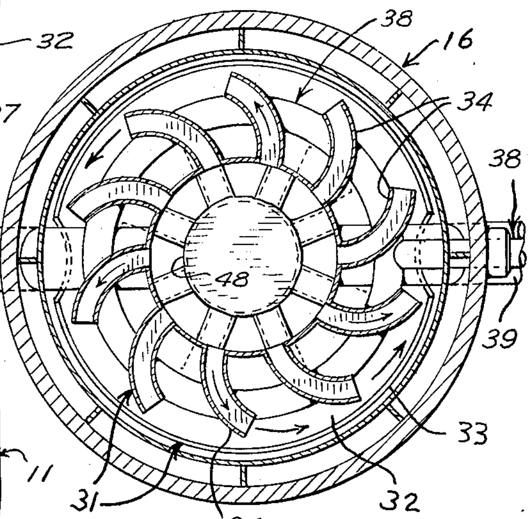
INVENTORS
TOBIAS STERN
JAY F. SCHONBERGER
BY John Maier, III
ATTORNEY

United States Patent Office 3,242,909
Patented Mar. 29, 1966

3,242,909

VAPOR GENERATORS

Tobias Stern, Rockaway, and Jay Frederic Schonberger, Totowa, N.J., assignors to Foster Wheeler Corporation, New York, N.Y., a corporation of New York Filed Dec. 4, 1964, Ser. No. 415,992
7 Claims. (Cl. 122—34)

This invention relates to vapor generators and more particularly to a conduit arrangement within a vapor generator.

A vapor generator as the term is herein used, has three main sections, namely, a heat exchanger, a liquid-vapor separator, and a conduit arrangement for conveying the liquid-vapor mixture from the heat exchanger to the liquid-vapor separator and for conveying the liquid from the separator to the heat exchanger.

A heat exchanger converts liquid into a liquid-vapor mixture by a heating fluid passing through the heat exchanger tubes immersed in the liquid to be vaporized. A liquid-vapor separator which receives the liquid-vapor mixture from the heat exchanger, removes any residual liquid from the liquid-vapor mixture. Since vapor naturally rises and liquid falls, it is convenient for the separator to be located above the heat exchanger.

Where vertical space is at a premium, it is necessary to place the separator vessel as close as possible to the heat exchanger and to obtain the necessary heat exchanger capacity by extending the heat exchanger horizontally. Although necessary, extension of the heat exchanger in the horizontal direction is a limitation upon satisfactory liquid and vapor circulation. Still another consideration is to limit the number of connections between the heat exchanger and vapor generator to a minimum. The reason for this is that added connections add to the complexity of manufacture and require special care to insure against leakage about the connections due to thermal stresses and faulty welds.

Already it has been recognized that multiple connections can be minimized while obtaining adequate flow distribution and circulation by providing instead a large central conduit between the heat exchanger and liquid-vapor separator. However, in the prior art, a concentric annular arrangement was utilized with either the vapor liquid traveling in a totally annular flow path. In such an arrangement, liqiud which has been supplied annularly in the separator continues to flow annularly throughout the conduit arrangement and through an annular downcomer located in the heat exchanger, while the converted vapor rises centrally and concentrically in the heat exchanger into the conduit arrangement and continues along a centrally located path through the separator.

One limitation of such an arrangement is that thermal stresses are created by the cold liquid from the separator coming into contact with the hot heat exchanger walls. The problem of thermal stresses caused by cold liquid contacting the hot heat exchanger walls is especially important in a vapor generator subject to drastic and rapid increases in load. This is because a drastic and rapid load increase requires large quantities of cold liquid to be fed into the vapor generator.

Another disadvantage to the previously mentioned prior art example of central-annular flow is that the annular space about the heat exchanger increases the size of the heat exchanger while not utilizing the dead space which exists of necessity in the center of the U-tubes.

Therefore, it is an object of this invention to provide a vapor generator having an improved apparatus for conveying liquid-vapor mixture from a heat exchanger to a liquid-vapor separator and for conveying the liquid-vapor separator to the heat exchanger.

Another object is to provide a vapor generator of increased compactness.

In accordance with this invention, a central liquid downcomer in the heat exchanger is combined with an annular liquid supply in the separator. This is accomplished by using a plurality of ducts within a large central conduit to carry the downcomer water from an annular downcomer space to a central downcomer space without having the downcomer water oppose the liquid-vapor mixture which rises upwardly through the central conduit in which the ducts are located. The disadvantage of increased size is overcome by use of the space in the center of the U-tubes in the downcomer.

The invention may be better understood from the following detailed description considered in conjunction with the accompanying drawings in which:

FIGURE 1 is an end view in elevation of a vapor generator of the present invention;

FIGURE 2 is a vertical section on line 2—2 of FIG. 1 on a larger scale with the upper portion broken away;

FIGURE 3 is a horizontal section on line 3—3 of FIG. 2 showing the transition section;

FIGURE 4 is a transverse section taken on line 4—4 of FIG. 2;

FIGURE 5 is a horizontal section on line 5—5 of FIG. 2 showing a central centrifugal liquid-vapor separator; and FIGURE 6 is a vertical cross-section similar to FIG. 4 of a modified form of the present invention.

Referring now to FIG. 1, a horizontally disposed elongated heat exchanger 11 serves to vaporize liquid into a liquid-vapor mixture. Manways 12 and 13, a primary heating-fluid inlet 14, and a primary heating-fluid outlet 15 are provided through the heat exchanger 11. Within the heat exchanger 11 are U-tubes 23 which are connected to a tube sheet 24.

A partition 25 located between one end of the heat exchanger 11 and the tube sheet 24 forms a fluid inlet compartment 26, and a fluid outlet compartment 30. The primary heating fluid inlet 14 is connected to the compartment 26 to introduce a heating fluid for circulation through the U-tubes 23. Primary heating-fluid outlet 15 is connected to compartment 30 for discharging the heating fluid from the heat exchanger 11.

A separator vessel 16 is located above the heat exchanger 11 and has a manway 17 and a steam outlet riser 19. The heat exchanger and the vessel 16 are connected by a cylindrical collar 20. As best seen in FIG. 2 the collar 20 extends outwardly from the heat exchanger 11 at heat exchanger opening 22 preferably located approximately midway along the length of the U-tubes 23 on the top of the heat exchanger 11. The collar 20 is connected to the vessel 16 at opening 21 which is located, preferably symmetrically in the bottom of the vessel 16.

Centrally located within the separator vessel 16 is a cylindrical baffle 27 having a passageway 35 therein. A lower cylinder 36 extending from the outer edge of the neck 20 forms the base of the cylindrical baffle 27. A frustrum 29 is connected at its larger end to the top of the lower cylinder 36. An upper cylinder 28 extends from the smaller opening of the frustrum. The upper cylinder 28 is in turn connected to a separator assembly 31 which is subsequently described.

The passageway 35 within the baffle 27 conveys the rising liquid-vapor mixture from the heat exchanger 11 to the separator assembly 31. The space between the outside of baffle 27 and the inside of the separator vessel 16 serves to form an annular water pocket 32 which receives water from the liquid-vapor separator assembly 31 or from a feed-water supply pipe 38 should make-up water be desired. Extending along the lower interior surface of the separator vessel 16 from the point of junction from the lower cylinder 36 and the neck 20 is a ring-shaped plate 37. The plate 37 assists in forming a water-tight junction with the lower cylinder 36 of the neck 20 and also protects the inner surface of the separator vessel 16 in the vicinity of the hot heat exchanger 11 from direct contact with the relatively cold water which forms in the water pocket 32.

Due to the comparatively large specific volume of the liquid-vapor mixture, it is advisable to provide a pair of additional conduits 39 to convey the liquid-vapor mixture from the heat exchanger 11 to the vapor liquid separator assembly 31. The conduits 39 receive the liquid-vapor mixture at a pair of openings 40 in the heat exchanger 11. The conduits 39 extend from the openings 40 through the separator vessel 16 and pass through the liquid pocket 32 to deliver the liquid-vapor mixture into the space 35 in the baffle 27 by means of openings 41 in the baffle 27.

In the center of the U-tubes 23 is a space 45 in which there is located a liquid downcomer 51 which serves to pass liquid downwardly into the bottom of the heat exchanger 11 before discharging it to contact the U-tubes 23. Directly in the center of the U-tubes 23 in a main section 53 of the liquid downcomer 51. Within the rectangular downcomer 51 are located curved spreader plates 54 which direct the water flow uniformly along the longitudinal length of the heat exchanger 11. At the base of the main section 53 is a lower divergent section 59 which directs outwardly the flow of the water passing downwardly through the liquid downcomer 51. On the top of the main section 53, adjacent the heat exchanger opening in an upper divergent section 52. Atop the upper divergent section 52 and concentrically located within the neck 20 is an outlet container 48, which is preferably in the form of a cylinder. The upper end of the inlet cylinder 48 is closed by a plate 49. The plate 49 serves to prevent the liquid-vapor mixture from entering the cylindrical container 48. If another shape of container is utilized other than a cylinder, the top should be closed in some suitable manner.

Located about the circumference of the inlet cylinder 48 are a series of openings 44 which are shown as rectangular in FIGURES 3, 4, and 5, but can be of any shape suitable for fluid flow such as elliptical as shown in FIGURE 6. About the periphery of the lower cylinder 36 within the baffle 27 is an equal number of openings 43 in the inlet cylinder 48. Since the bottom of the baffle 27 is located above the annular neck 20 and the inlet cylinder 48 is located approximately within the annular neck 20, the openings 44 are on a lower plane then the openings 43. A series of ducts 46 connect the openings 43 and 44. The openings 43 and 44 are preferably evenly spaced and are so located as to permit a passageway for the liquid-vapor mixture between them. It is also preferable for the openings 43 and the openings 44 to each lie on a common horizontal plane.

Liquid is received within the pocket 32 from the liquid-vapor separator assembly 31 or from the make-up pipe 38 or from both depending on operating conditions. As the liquid accumulates in the pocket 32 it enters the openings 43 in the lower cylinder 36 at the bottom of the baffle 27 and flows through the ducts 46 downwardly and inwardly to the lower openings 44 and then into the inlet cylinder 48. The upper divergent section 51 then guides the water into the section 53 which conveys the water through the space 45 to the bottom of the heat exchanger 11 where it flows outwardly and up to contact the U-tubes 23 and is thereby vaporized. The liquid vapor mixture rises upwardly from the heat exchanger 11, passing through the inside of the neck 20 and on the outside of the liquid downcomer 51 and on the outside of the ducts 46. Above the ducts 46 the liquid-vapor mixture passes into the baffle 27 and is conveyed to the separator assembly 31.

The liquid-vapor separator assembly 31 is best seen in FIGURE 6; it is of the centrifugal type. Although this centrifugal type of separator is preferred, other apparatus for use in the separating assembly 31 may be used with this invention. As has been described, the steam flows upward within the vessel 27 and flows outwardly through the curved nozzles 34 of the separator assembly 31. Due to the arcuate shape of the nozzles 34, a primary separation of the liquid from the liquid vapor mixture takes place within the nozzles 34. This is caused by the centrifugal action of the liquid vapor mixture as it is directed along the arcuate path of a curved nozzle 34. As the liquid vapor mixture exits from the nozzles 34, it is forced against a cylindrical wall 33 in a tangential path to provide a circular stream on the wall 33. The heavier liquid flows down the wall 33 and then drops from the wall 33 to the liquid pocket 32. The vapor, however, rises upwardly to the vapor outlet 19.

FIGURE 6 shows various design modifications that may be made within the scope of the present invention. The ducts 46 are replaced with round tubes 60. The upper openings 43 are replaced with openings 61 and lower openings 44 are replaced with openings 62. The openings 61, and 62 are elliptical. The upper divergent section 52 is replaced by two sections 67, 68 to provide a more gradual water transition from the central water collector 48 to the main downcomer 53 thereby promoting water spread-out along the length of the downcomer channel.

Although the invention has been described in its preferred form with a certain degree of particularity, it is understood that the present disclosure of the preferred form has been made by way of example and that numerous other changes and modifications in the details of construction and the combination and arrangements of parts may be resorted to without departing from the spirit and the scope of the invention as in the appended claims.

What is claimed is:

1. A vapor generator comprising:

a heat exchanger of the tube type for vaporizing liquid and having an opening therethrough;

a collar extending outwardly from said opening in said heat exchanger;

a separator vessel connected to said collar;

a baffle extending outwardly from said collar and within said separator vessel, said baffle and said vessel forming a pocket therebetween, said baffle having a plurality of openings therethrough adjacent said collar;

a liquid downcomer forming an enclosed passageway from the top of said heat exchanger to the bottom of said heat exchanger and including a container located within said collar, said container having a plurality of openings therethrough, and a multiplicity of ducts each connecting one of said openings in said baffle to one of said openings in said collector whereby said liquid flows through said downcomer to the bottom of said heat exchanger.

2. A vapor generator comprising:

a heat exchanger of the tube type for vaporizing liquid and having a circular opening therethrough, a cylindrical collar extending outwardly from said circular opening in said heat exchanger;

a cylindrical vessel connected to said cylindrical collar;

a cylindrical baffle extending outwardly from said cylindrical collar and substantially concentrically within said vessel, said cylindrical baffle and said cylindrical vessel forming an annular pocket therebetween, said cylindrical baffle having a plurality of openings therein about its periphery communicating with said annular pocket;

a liquid downcomer forming an enclosed passageway from the top of said heat exchanger to the bottom of said heat exchanger and including a cylindrical container located substantially concentrically within said collar, said container having a plurality of openings therethrough about its periphery equal in number to the number of openings about said cylindrical collector, and a multiplicity of ducts each connecting one of said openings in said cylindrical baffle to one of said openings in said collector, said ducts extending upwardly and radially outwardly from said cylindrical container.

3. A vapor generator according to claim 2 wherein said ducts have a rectangular cross-section.

4. A vapor generator according to claim 2 wherein said ducts have a circular cross-section.

5. A vapor generator comprising:

a heat exchanger having substantially horizontally located U-tubes therein for circulating a heating fluid to vaporize a liquid, said heat exchanger having a circular opening therein located on the top of said heat exchanger at a point approximately midway along the length of said horizontally-located tubes;

a cylindrical collar extending upwardly from said circular opening in said heat exchanger;

a cylindrical vessel located above and in communication with said cylindrical collar;

a cylindrical baffle extending outwardly from said cylindrical collar and substantially concentrically within said cylindrical vessel, said cylindrical baffle and said cylindrical vessel forming an annular pocket therebetween, said cylindrical baffle having a plurality of openings therein about its periphery communicating with said annular pocket;

a liquid-vapor separator means located above said cylindrical baffle and connected thereto, said liquid-vapor separator means being adapted to discharge separated liquid into said annular pocket;

a liquid downcomer forming an enclosed passageway from the top of said heat exchanger to the bottom through the center of said U-tubes and including a cylindrical container located substantially concentrically within said collar, said container having a plurality of openings therethrough about its periphery equal in number to the number of openings about said cylindrical collector, and a multiplicity of ducts each connecting one of said openings in said cylindrical baffle to one of said openings in said collector, said cuts extending upwardly and radially outwardly from said cylindrical container.

6. A vapor generator according to claim 5 wherein said ducts have a rectangular cross-section.

7. A vapor generator according to claim 5 wherein said ducts have a circular cross-section.

References Cited by the Examiner

UNITED STATES PATENTS

| | | | |
|---|---|---|---|
| 2,654,351 | 10/1953 | Ammon | 122—488 X |
| 3,103,206 | 9/1963 | Halvorsen et al. | 122—34 |

KENNETH W. SPRAGUE, *Primary Examiner.*